INVENTOR.
ETHAN ARONOFF

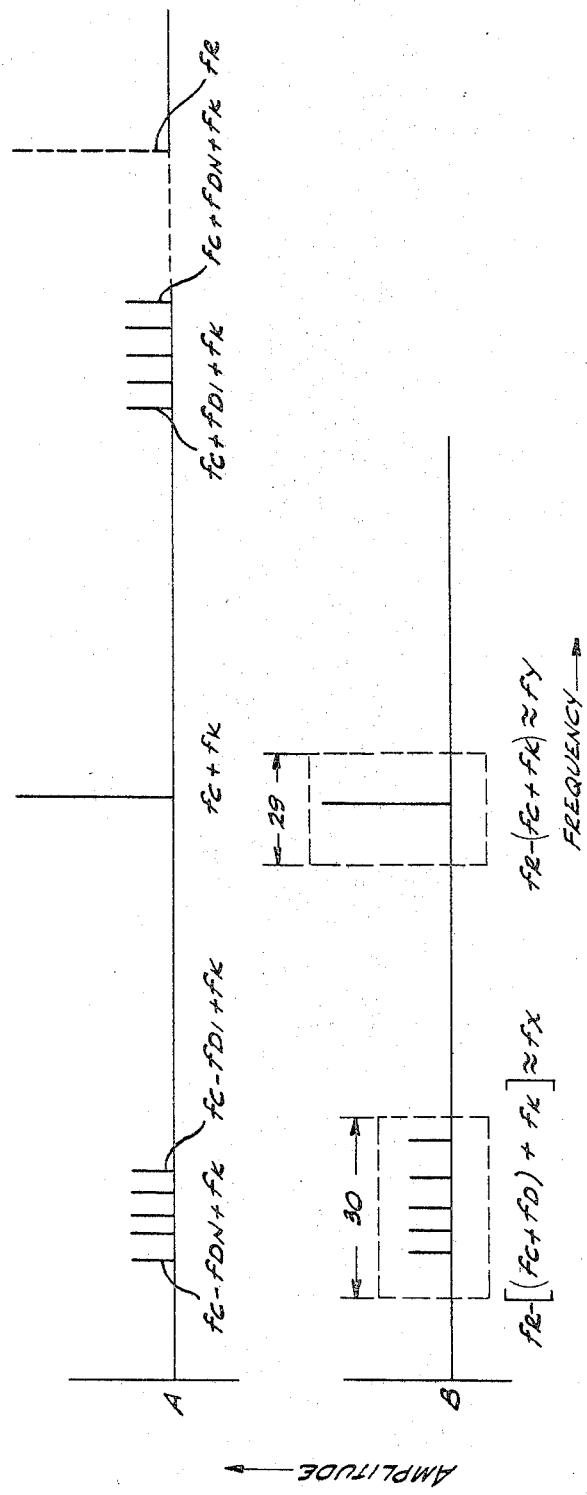

United States Patent Office 3,427,618
Patented Feb. 11, 1969

3,427,618
SYSTEM FOR SIMULATING RADAR TERRAIN RETURNS WITH COHERENCY COMPENSATION
Ethan Aronoff, Los Angeles, Calif., assignor to Hughes Aircraft Company, Culver City, Calif., a corporation of Delaware
Continuation of application Ser. No. 566,059, July 18, 1966. This application Dec. 11, 1967, Ser. No. 689,466
U.S. Cl. 343—17.7       12 Claims
Int. Cl. G01s 7/40

ABSTRACT OF THE DISCLOSURE

A radar terrain characteristic simulator including a carrier signal frequency drift compensator useful in ground testing of an airborne radar tracking loop or the like. The drift compensator compensates for the drifts of the RF reference carrier signal. Terrain characteristics are simulated by providing a plurality of signal generators which produce a plurality of output signals of differing frequencies to simulate terrain Doppler returns. These signals are modulated with the common carrier and transmitted to a site remote from the test site where a radar is located. A pair of bandpass filters and a mixer is employed to remove the frequency drift to insure that error due to carrier signal frequency drift is not introduced into the test.

---

Figure 1:
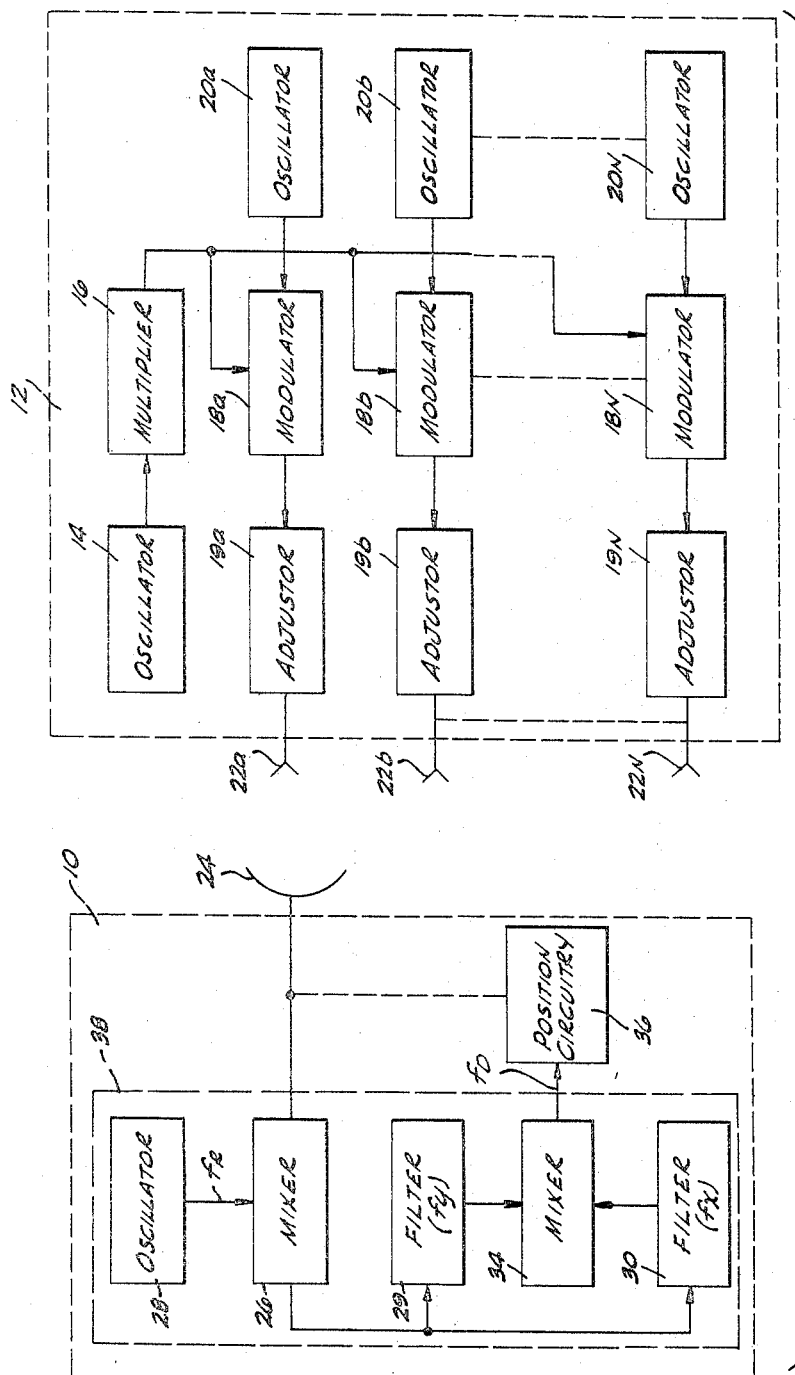

This application is a continuation of patent application Ser. No. 566,059, filed July 18, 1966, Ethan Aronoff, inventor, now abandoned.

This invention relates to a drift compensator useful in radar system test equiment and more particularly to a novel and improved system with a drift compensator for compensation of long-term frequency drift in equipment useful in simulating radar ground return signals having a variety of characteristics to permit accurate testing of a radar tracking system.

The present invention relates in some respects to copending patent application Ser. No. 566,058, filed July 18, 1966, Frederick C. Williams, inventor, now Patent No. 3,365,719, issued Jan. 23, 1968, and assigned to the same assignee as the present invention. In this co-pending patent application, there is disclosed a system for simulating radar terrain characteristics in providing a plurality of Doppler signal generators which produce a plurality of output signals at differing frequencies which are modulated with a carrier frequency and transmitted to a site remote from the test site where a radar receiver is located and includes a means for receiving the transmitted signal for testing thereof.

In the system as described in the aforesaid co-pending patent application problems occur in long-term frequency drift in the transmitted signals which are indicative of Doppler terrain signals. Such drift should be compensated to assure that error is not introduced into the test. This may be compensated for at the test site. The present invention provides coherency compensation in a simulator according to the teaching of the aforesaid co-pending patent application, for example, which simulates the Doppler return signal from a series of terrain patches. Because of the long-term frequency drift in the RF carrier signal, it becomes necessary to compensate for this drift at the site of the target tracking circuitry under test. Because of the carrier drift, the coherency compensation provided at the tracking circuit insures the accuracy of the tracking loop and is unaffected by drifts in the carrier. By providing coherency compensation for the carrier drift at the target tracking loop being tested, the accuracy of the measurement is of a given certainty.

It therefore becomes one object of this invention to provide a novel and improved coherent compensator used in a radar terrain simulator.

Another object of this invention is to provide a novel and improved coherency compensator used in a system wherein a plurality of simulated signals at Doppler frequencies are generated and transmitted to a radar at a site remote from the generated signals.

These and other objects, features and advantages will become apparent to those skilled in the art when referring to the following drawings wherein like reference numerals indicate like or corresponding parts throughout the several views and wherein:

FIGURE 1 is a schematic block diagram of one preferred embodiment of this invention; and FIGURE 2 is a graph illustrating an amplitude versus frequency spectral diagram of the frequencies at various positions in the embodiment shown in FIGURE 1.

Turning now to FIGURE 1, there is shown in the basic block diagram of one preferred embodiment of this invention equipment positioned at test site 10 and a radar terrain simulator 12 positioned remote from site 10. It is the function of the radar terrain simulator 12 to generate and transmit a plurality of signals indicative of the Doppler frequency shift characteristic of ground terrain patches, or the like, to the equipment under test at site 10. At radar terrain simulator 12 there is included an oscillator 14 which generates a carrier signal at a predetermined frequency which may be in the RF range and which includes a long-term frequency drift denoted as $f_k$. The output of oscillator 14 is coupled to a multiplier 16 which is used for increasing the frequency of the signals generated in oscillator 14 for subsequent modulation and transmission. Hereinafter, the output of multiplier 16 will be denoted as $f_C$ for the purpose of this explanation and when the long-term frequency drift is present in the output signal, it will be denoted as $f_C \pm f_K$ where $f_K$ is the frequency drift of the carrier and is $f_k$ increased by the multiplication factor of multiplier 16. The output of multiplier 16 is applied to a plurality of modulators 18a–18n.

A plurality of oscillators 20a–20n is provided and each output of each oscillator is coupled to its respective modulator 18a–18n. For example, the output of oscillator 20a is coupled to modulator 18a, the output of oscillator 20b is coupled to modulator 18b, and the output of oscillator 20n is coupled to modulator 18n. Each of these oscillators 20a–20n provides an output signal having a frequency which simulates a ground patch and is referred to as a Doppler frequency. These signals are denoted as $f_{D1}$ through $f_{DN}$. Modulators 18a–18n provide an output which is the equivalent of the output signal at the carrier frequency $f_C$ modulated by the signals at the simulated Doppler frequency provided by oscillators 20a–20n respectively. The output thereof is thereby denoted as $$f_C \pm f_D + f_K$$

where $f_D$ is all Doppler signals $f_{D1}$ through $f_{DN}$. Each of the modulated signals from modulators 18a–18n is simultaneously applied to respective radiating elements 22a–22n, through amplitude and phase adjustors 19a through 19n.

Signals transmitted by antennas 22a–22n are received by a receiving antenna 24 which is coupled to mixer 26 and the transmitted signals are applied to mixer 26. An oscillator 28 provides a signal which is mixed in mixer 26 with the signal received at antenna 24 from the antennas 22a–22n. The frequency of the signals of oscillator 28 and denoted as $f_R$ is used to reduce the frequency of the signal received by antenna 24 to the audio range. The output of mixer 26 is applied to filter 29 and filter 30 simultaneously and output of filter 29 and filter 30 is applied to a mixer 34 which provides an output signal to position circuitry 36. Frequency of the signal on the output of mixer 34 is equal to the difference of the signal provided by filters 29 and 30 which is only, as will be explained hereafter, the signals at the Doppler frequency generated by simulator 12.

Oscillator 28, mixer 26, filters 29 and 30 and mixer 34 comprise circuitry which makes up coherency compensator 38.

As previously stated, the purpose of coherency compensator 38 is to remove the frequency drift $f_K$ of the carrier frequency $f_C$ and the transmitted sideband $f_{D1}-f_{DN}$. By removal of this frequency drift, there is assured coherency of the reference signal and thereby prevents errors from being introduced into the tracking circuitry under test 10.

Signals received by antenna 24 are mixed in the mixer 26 which provides an output now in the audio range and includes the Doppler frequency $f_D$ and is designated on the output of mixer 26 $f_R-[(f_C+f_D)+f_K]$ and $f_R-(f_C+f_K)$. This signal, now being in the audio range, is applied to the input circuit of filters 29 and 30 simultaneously. The output of signals of filters 29 and 30 are referred to as $f_Y$ and $f_X$ respectively. Filter 29 has a characteristic of only passing signals having the frequency $f_R-(f_C+f_K)$ which is denoted as $f_Y$ on the output thereof while filter 30 only passes signals having the frequency $f_R-(f_C+f_D+f_K)$ which is denoted as $f_X$ on the output thereof. The amplitude versus frequency spectrum of these signals is set out in graph A of FIGURE 2. The signals having the frequency $f_X$ and $f_Y$ are mixed in mixer 34 which only passes a signal which is the Doppler shift frequencies $f_{D1}$ through $f_{DN}$.

With reference now to FIGURE 2, where there is shown a frequency spectrum with the carrier frequency $f_C+f_K$ denoted thereon on graph A and is included with the upper sidebands of the transmitted signal at frequencies $f_C+f_D+f_K$, the lower sidebands of the transmitted signal at $f_C-f_D+f_K$, and the frequency $f_R$.

Graph B in FIGURE 2 indicates the spectral diagram of the frequencies $f_R-(f_C+f_K)$ and $f_R-(f_C+f_D+f_K)$ wherein $f_R-(f_C+f_K)$ being the frequency $f_Y$ as heretofore explained and $f_R-(f_C+f_D+f_K)$ being the frequency $f_X$. These are shown by their characteristics in being passed by their respective filters by the dashed lines and denoted 29 and 30 to correspond thereto. As can be seen when these two frequencies are mixed in mixer 34, and shown mathematically as:

$$f_R-(f_C+f_K)-[f_R-(f_C+f_D+f_K)]=f_D$$

Thus the output of mixer 34 is the stabilized Doppler frequencies of $f_{D1}$ through $f_{DN}$, and is used to control antenna 24 in azimuth to position it at a given Doppler frequency.

Having thus shown but one preferred embodiment of this invention, what is claimed is:

1. In a radar test system comprising:
   a transmitter for transmitting an electrical carrier signal modulated by simulated test signals at differing frequency ranges; and
   a receiver for receiving the electrical test signals transmitted by said transmitter and including a drift compensator coupled to said receiver for removing long-term frequency drifts in the transmitted electrical test signals.

2. In the radar test system as defined in claim 1 and further comprising a means for generating the modulated electrical signal being coupled to said transmitter and including:
   a first generator for generating an electrical signal at a first frequency;
   a plurality of second generators for generating a plurality of electrical simulated signals at a frequency different from said first frequency, each said signal of said plurality being at differing frequencies; and
   a modulator for each of said plurality of second generators and being coupled to each one of said respective plurality of second generators and to said first generator for modulating the electrical signal of the first frequency with the electrical simulated signals of the differing frequencies.

3. In the radar test system as defined in claim 1 said drift compensator comprising:
   a first means for passing only signals received at said receiver of the electrical carrier signal frequency;
   a second means for passing only electrical signals of the carrier signal frequency modulated by the differing frequencies; and
   a mixer for providing an output signal which is the difference between the frequency of said carrier signal and said carrier signal modulated by the differing frequencies, said mixer being coupled to said first means and said second means and having an output means coupled to said receiver.

4. In the radar test system as defined in claim 1 said means for generating the modulated electrical signals comprising:
   a first generator for generating an electrical signal at a first frequency;
   a plurality of second generators for generating a plurality of electrical simulated signals at a frequency different from said first frequency, each said signal of said plurality being at differing frequencies;
   a modulator for each of said plurality of second generators and being coupled to each one of said respective plurality of second generators and to said first generator for modulating the electrical signal of the first frequency with the electrical simulated signals of the differing frequencies; and
   wherein said frequency drift compensator comprises a first means for passing only signals received at said receiver of the electrical carrier signal frequency;
   a second means for passing only electrical signals of the carrier signal frequency modulated by the differing frequencies; and
   a mixer for providing an output signal which is the difference between the frequency of said carrier signal and said carrier signal modulated by the differing frequencies, said mixer being coupled to said first means and said second means and having an output means coupled to said receiver.

5. A system for simulating the characteristics of radar terrain return signals for the performance test of a radar system having a receiver and a target tracking loop, said system comprising:
   means for generating a plurality of low frequency output signals, each of the plurality having a predetermined frequency spacing with respect to each other;
   means for supplying a carrier signal having a relatively long-term frequency drift, said means including means for simultaneously modulating sampled portions of the supplied carrier frequency with the plurality of low frequency output signals, said means having a plural output means for providing a plurality of modulated carrier signals;
   means for transmitting each of said plurality of modulated signals to the radar system under test, said transmitting means being coupled to the output means of said supplying means; and
   means for compensating for the frequency drift components of the modulated carrier signals, said compensating means being coupled between the receiver and the tracking loop of the radar under test.

6. The system as defined in claim 5 wherein said means for generating a plurality of low frequency output signals comprises a plurality of stable oscillators, each of said oscillators having an audio output signal different from each other.

7. The system as defined in claim 5 wherein said means for modulating sampled portions of the received carrier frequency comprises a plurality of frequency modulators, each modulator of said plurality being coupled to said means for generating a plurality of low frequency output signals.

8. A system for simulating the characteristics of radar terrain return signals for the performance test of a radar system including a receiver and an antenna positioning loop, the system comprising:
- a source of stable carrier reference signals having a long-term frequency drift component;
- a generator for simultaneously generating a plurality of predetermined and relatively close spaced Doppler frequency output signals;
- a modulator coupled between said source and said generator for simultaneously modulating sample portions of the reference carrier signals with said Doppler frequency output signals and having a plurality of outputs of modulated radio frequency output signals;
- a transmission means coupled to the outputs of said modulator for the separate and simultaneous transmission of each of said modulated radio frequency signals; and
- a compensation means coupled between the receiver and the antenna positioning loop of the radar system under test to render the received reference frequency carrier coherent by compensating for the long-term drift component.

9. In the system as defined in claim 8 said Doppler frequency generator comprising a plurality of stable oscillators, each of said oscillators having an audio output signal different from each other and representative of simulated Doppler return signals.

10. The system defined in claim 8, said modulator comprising:
- a plurality of frequency modulators, each modulator of said plurality being coupled to said Doppler frequency generator for receiving respective audio frequency outputs and being coupled to said source of carrier signals for modulating in frequency each of said carrier signals with a respective audio output signal.

11. In the system as defined in claim 8 wherein:
said Doppler frequency generator comprising a plurality of stable oscillators, each of said oscillators having an audio output signal different from each other and representative of Doppler return signals; and said modulator comprising a plurality of frequency modulators, each modulator of said plurality being coupled to said Doppler frequency generator for receiving respective audio frequency outputs and being coupled to said source of carrier signals for modulating in frequency each of said carrier signals with a respective audio output signal.

12. In the system as defined in claim 8, said compensator means comprising:
- a first bandpass means for passing the band of the carrier reference frequency signals, said first bandpass means having an input circuit and an output circuit, the input circuit being coupled to the radar system;
- a second bandpass means for passing the band of modulated radio frequency output signals, said second bandpass means having an input circuit and an output circuit, the input circuit being coupled to the radar system receiver; and
- a mixer for mixing the frequencies passed by said first and said second bandpass means, said mixer having a first input circuit and a second input circuit, and an output circuit connected to said antenna positioning loop, the first input circuit being coupled to the output circuit of said first bandpass means and said second input circuit being coupled to the output circuit of said second bandpass means.

References Cited

UNITED STATES PATENTS 3,147,437  9/1964  Crafts et al. _____ 325—49

RODNEY D. BENNETT, *Primary Examiner.*

T. H. TUBBESING, *Assistant Examiner.*

U.S. Cl. X.R.

35—10.4